(12) United States Patent
Larson

(10) Patent No.: US 7,134,705 B2
(45) Date of Patent: Nov. 14, 2006

(54) WINDSHIELD FOR A MOTORCYCLE, MOTOR TRICYCLE OR BICYCLE

(76) Inventor: Bruce E. Larson, 10306 Parkland Ct., Hales Corners, WI (US) 53130

( * ) Notice: Subject to any disclaimer, the term of this patent is extended or adjusted under 35 U.S.C. 154(b) by 18 days.

(21) Appl. No.: 10/944,163

(22) Filed: Sep. 17, 2004

(65) Prior Publication Data

US 2006/0061126 A1 Mar. 23, 2006

Related U.S. Application Data

(60) Provisional application No. 60/503,360, filed on Sep. 17, 2003.

(51) Int. Cl.
*B62J 17/04* (2006.01)
(52) U.S. Cl. .................... 296/78.1; 296/96.22
(58) Field of Classification Search ............. 296/78.1, 296/96.22; D12/182, 186
See application file for complete search history.

(56) References Cited

U.S. PATENT DOCUMENTS

| | | | |
|---|---|---|---|
| 1,042,305 A * | 10/1912 | Wright ................... 296/78.1 |
| 1,292,610 A * | 1/1919 | Jackson .................. 296/78.1 |
| 2,237,594 A | 4/1941 | Dunlap |
| 2,675,266 A | 4/1954 | Comiskey |
| 3,866,242 A | 2/1975 | Slagel |
| 4,087,110 A | 5/1978 | Vetter |
| 4,089,556 A | 5/1978 | Stobar |
| 4,168,098 A | 9/1979 | Willey |
| D266,321 S | 9/1982 | Morioka et al. |
| D273,288 S | 4/1984 | Johnson |
| 4,696,509 A * | 9/1987 | Yagasaki et al. .......... 296/78.1 |
| 5,222,752 A * | 6/1993 | Hewitt .................. 296/78.1 |
| 5,490,573 A | 2/1996 | Hagiwara et al. |
| 5,658,035 A | 8/1997 | Armstrong |
| 5,853,217 A | 12/1998 | Armstrong |
| 5,855,404 A | 1/1999 | Saunders |
| 5,857,727 A | 1/1999 | Vetter |
| 5,927,791 A | 7/1999 | De Voe |
| D431,804 S | 10/2000 | Willey |
| 6,176,538 B1 | 1/2001 | Lawson et al. |
| 6,254,166 B1 | 7/2001 | Willey |
| 6,293,606 B1 | 9/2001 | Jarosz et al. |
| 6,325,441 B1 * | 12/2001 | Ugolini ................. 296/78.1 |
| 6,416,108 B1 * | 7/2002 | Elswick ................. 296/78.1 |
| 6,736,441 B1 | 5/2004 | Barber et al. |
| 6,808,219 B1 * | 10/2004 | Barber et al. ........... 296/78.1 |
| 2005/0161970 A1 * | 7/2005 | Willey .................. 296/78.1 |

* cited by examiner

*Primary Examiner*—Jason Morrow
(74) *Attorney, Agent, or Firm*—Donald J. Ersler

(57) ABSTRACT

A windshield for a cycle, such as a motorcycle, bicycle or tricycle, having a dihedral leading surface to provide operator protection of wind, dust, bugs and debris. The windshield further comprises a pair of side panels extending from the dihedral leading surface to provide added stability to the cycle by providing a corrective steering force behind the axis of the cycle's fork to maintain the orientation of the fork into the wind. The windshield is securely attached to a cycle without the use of tools and with adequate strength to withstand the rigors of prolonged use. The attachment between the cycle and the windshield preferably includes a break-away feature to allow for one piece break-away of the windshield if subjected to rear impact from a cycle's rider or passenger during a crash. The windshield is free from metal bracketry extending into the operator's field of vision or potential path or trajectory of the operator or passenger in an accident, due to the strength inherent in the windshield's shape and construction.

60 Claims, 4 Drawing Sheets

WINDSHIELD FOR A MOTORCYCLE, MOTOR TRICYCLE OR BICYCLE

CROSS REFERENCE TO RELATED APPLICATION

This application claims priority to U.S. Provisional Application Ser. No. 60/503,360 filed Sep. 17, 2003.

BACKGROUND OF THE INVENTION

In the development of motorized transport, one of the first enhancements, after reasonable vehicular reliability was achieved, was a means of protecting the operator and passengers from flying insects, dust, and the elements of wind, sunlight, rain, heat and cold. With automobiles and the like, this protection manifested itself in enclosed bodies with windows that could be rolled up and down, and windshield and vent windows that could be tipped open or closed. Heating, venting, and air conditioning followed.

Motorcyclists, however, enjoyed no such protections, except through riding apparel, until after World War II when, following the military's lead, motorcycle windshields were offered to the public. They were typically a nearly flat, semi-oval shaped piece of clear plastic mounted round side up, on and extending upward from the handlebars. They were held in place with metal bracketry and re-enforced with a steel rod inside the periphery of the inner edge. They had a gangly, afterthought appearance and were looked upon with disdain by the majority of "enthusiasts."

Various improvements were made over the years including the development of frame mounted fairings and bodywork. However, there is still room for improvement, namely:

1. Provide adequate protections as listed above while minimizing blind spots in the operator's field of view.

2. Provide adequate protections as listed above without resorting to a windshield or fairing of such large proportions that the overall appearance or styling of the vehicle is compromised.

3. Provide a means of enhancing aerodynamics such that air displaced by the motion of the vehicle is encouraged to flow around the operator with a minimum of turbulence, rather than over the windshield and onto him, causing buffeting and fatigue.

4. Provide stability to the vehicle at moderate to high speeds that will tend to keep the vehicle on its directed line of travel despite head winds, cross winds, and traffic generated turbulence.

5. Be easily removed for cleaning of its inner surface and the underlying vehicle, or for operating sans protection, without the use of tools; and then likewise re-attached. Detachable windshields are disclosed in U.S. Pat. No. 6,736,441; U.S. Pat. No. 6,254,166; U.S. Pat. No. 6,176,538; U.S. Pat. No. 5,853,217; and U.S. Pat. No. 5,658,035.

The Ideal Windshield for the Vehicles Mentioned above Would Have these Additional Properties:

6. Be clear, non-yellowing, optically non-distorting, and un-changing in the extremes of temperatures to be expected, say, 20 to 120 degrees Fahrenheit.

7. Be mounted and safely held in place during operation without the use of metal bracketry extending into the path the operator and/or passenger might follow if thrown from the vehicle in an accident.

8. Be made of material unlikely to fracture in such a way when struck by a stone or piece of metal, or as described in #7, so as to create a hazard to the operator or passenger, yet be strong enough, flexible enough, and fatigue resistant enough to withstand the rigors of use without cracking or breaking.

9. Be scratch resistant from impingement by typical airborne debris or from reasonable efforts to clean it.

10. Be capable of manufacture and installation at a reasonable and competitive price.

11. Through enhanced aerodynamics provide improved gas mileage, or in the case of bicycles, improved operator efficiency.

12. Be as compact as possible consistent with the above requirements so as to complement the styling and appearance of the underlying vehicle, rather than detract from it.

13. Extend the listed protections as far backward toward the operator as possible without interfering with his visibility or operation of the vehicle.

SUMMARY OF THE INVENTION

The subject invention incorporates all of the improvements listed above by taking a novel approach, namely, replacing the traditional, slightly convex, plastic, semi-oval windshield, as disclosed in prior art, with a cut-away section of a thin walled hexagonal cylinder, so oriented in use that the leading surface is dihedral, its vertex coinciding with the vertical longitudinal centerline of the vehicle and inclined backward on this same centerline anywhere from five to 45 degrees, but preferably about thirty degrees. The combination of dihedral angle and the backward inclination produce a total of thirty-five degrees of wind deflection across the entire frontal surface on the preferred embodiment, as opposed to a range of zero to about 15 degrees across state-of-the-art windshields. This results in a much more efficient aerodynamic management of oncoming wind and a reduction in turbulence and the resultant buffeting of the rider.

The subject windshield rises from an imaginary horizontal line five to six inches below the crotch of the fork, to a few inches below the operator's line of vision, allowing for the predominant preference of motorcyclists to look over rather than through their windshield. A lengthened version can easily be manufactured for those preferring to look through their windshield. There is an arch shaped cut out for the headlight.

The remaining hexagonal sides adjoining each of the above frontal planes, respectively, are then parallel to the line of travel and are cut out to accommodate styling and aerodynamic considerations, and the contour of the gas tank when the steering fork is turned to either side. Leather fringe of five to six inch length is attached to the trailing edge of the bottom two thirds of each parallel side to provide a means of dissipating wind turbulence in air coming off of the side surfaces.

The invention's one piece construction permits all points of attachment of the windshield to the motorcycle to be on the fork and therefore below the handlebars and without any bracketry extending into the viewing area. Unlike a frame mounted fairing, this method of mounting allows the wind deflector to move with the fork, an important benefit for maintaining enhanced stability while following curves in the highway. It is also more stylish, minimalist, and complementary to the underlying vehicle than a fairing. One piece construction simplifies the application of hard coating to impart scratch resistance necessary for motor vehicle glazing.

Attachment to the vehicle is accomplished through the use of a filler bracket or "U" channel on either side of the fork, one leg of which is bolted to existing threaded holes in the fork or similar accommodation, the other having properly located holes that coincide with rubber grommet lined holes in the windshield. A grooved, headed pin is then passed through the grommetted windshield hole and filler bracket hole and secured with a hand operated, self locking circlip, or similar devise. Two of these assemblies are located on each side of the fork; the uppermost being only about an inch from the trailing edge of each side, it is anticipated that the entire windshield should readily "break-away" upon the impact of a rider or passenger in an accident. Such one piece "break-away", and absence of metal bracketry above the handlebar is a desirable safety feature in windshield design.

DETAILED DESCRIPTION PREFERRED EMBODIMENTS

Figure 1:
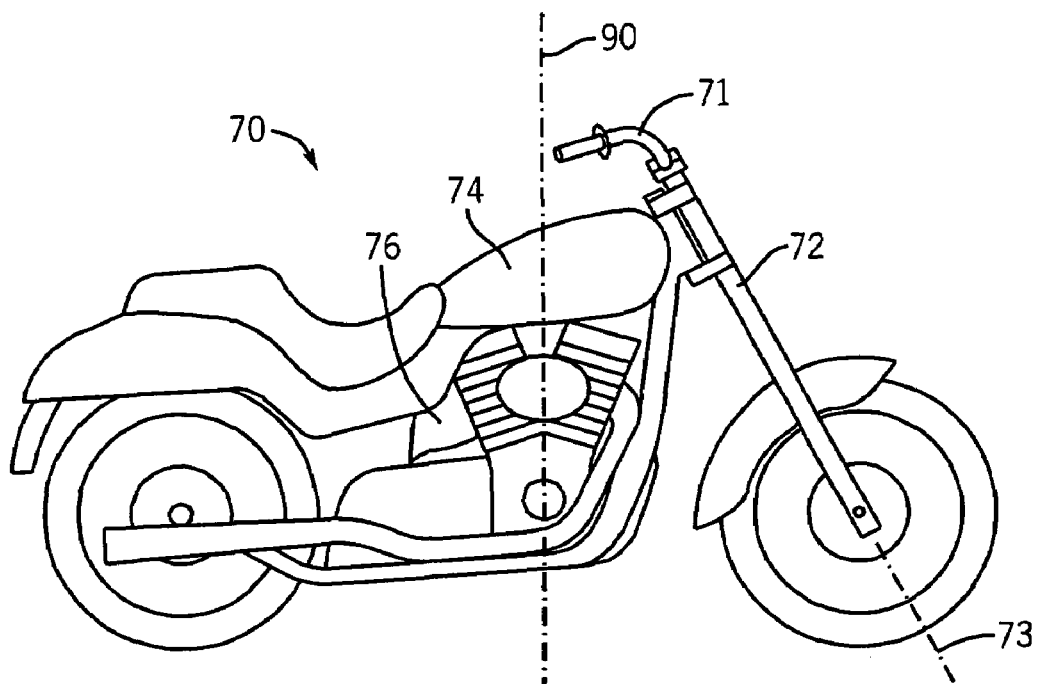
FIG. 1 is a plan side view of a motorcycle depicting a lateral plane of the motorcycle.
Figure 2:
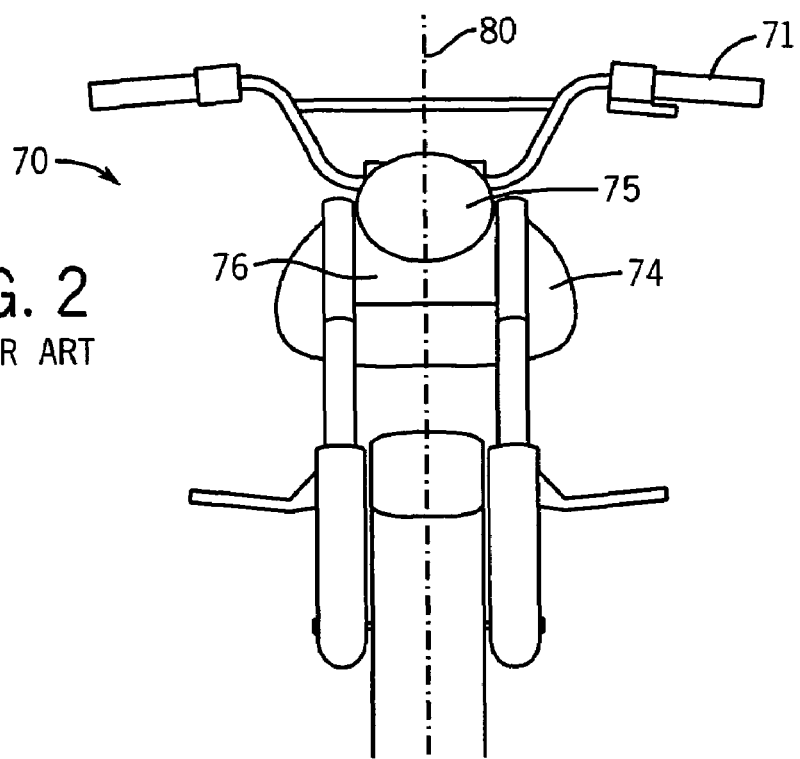
FIG. 2 is a front view of a motorcycle depicting the longitudinal center plane of the motorcycle.

FIGS. 1 and 2 demonstrate a typical cycle, such as a motorcycle, without a windshield. In FIG. 1, a lateral plane 90 is depicted. Lateral plane 90 is a vertical plane which is perpendicular to the direction of forward travel of the cycle. Vehicle 70 also includes handlebar 71, fork 72 with fork axis 73, gas tank 74 and body 76. Preferably, the fork axis intersects lateral plane 90 to form an angle of about 30 degrees. One of skill in the art will realize that this angle of intersection may vary from approximately 5 degrees to approximately 60 degrees. In FIG. 2, vertical longitudinal center plane 80 is depicted. Also shown on motorcycle 70 is handlebar 71, gas tank 74, head light 75 and body 76.

Figure 3:
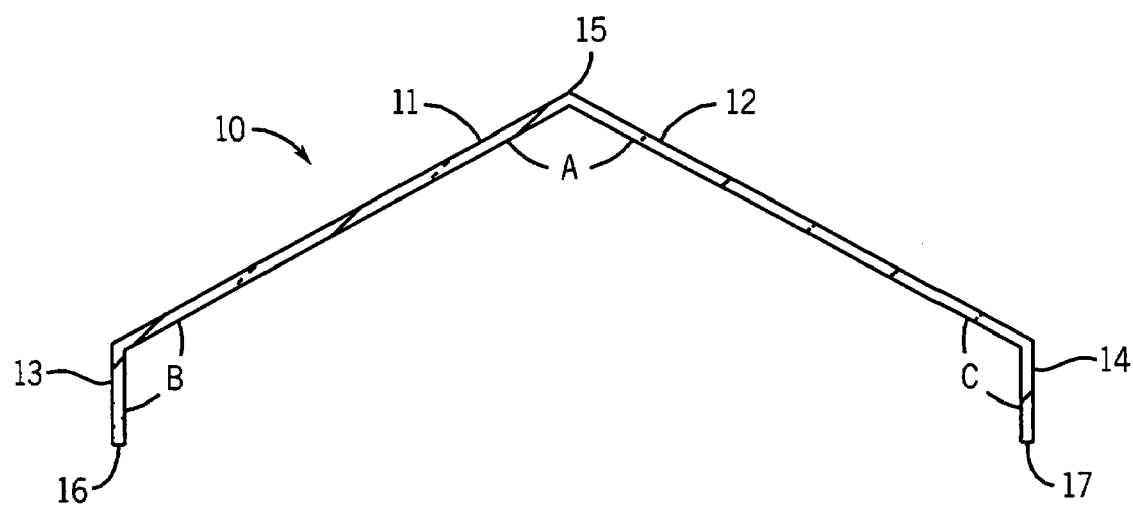
FIG. 3 is a cross sectional plan view of the windshield shown in accordance with the invention.

Referring now to FIGS. 3–10 therein is depicted the subject windshield of the present invention mounted on a motorcycle. Referring now to FIG. 3, windshield 10 includes a first portion 11, second portion 12, third portion 13 and fourth portion 14. First and second portions intersect at an included angle of preferably less than 135 degrees. As shown, third and fourth portions 13 extend from first and second portions 11, 12 at an included angle of less than about 135 degrees. Preferably, the angle formed by first and second portions 11, 12 (Angle A) is about 120 degrees. Preferably, the angle formed by first and third portions 11, 15 (Angle B) is about 120 degrees. Preferably, the angle formed by second and fourth portions 12, 14 (Angle C) is about 120 degrees.

When the windshield 10 is attached to the cycle 70, the windshield 10 is properly aligned when the vertex 15 is aligned with longitudinal centerline 80 of the motorcycle.

First and second portions 11, 12 intersect at vertex 15 to form a dihedral leading surface. Vertex 15 is parallel to fork axis 73 and, because windshield 10 is mounted to fork 72, vertex 15 remains parallel to fork axis 73 when fork 72 is turned. Preferably, the windshield 10 is mounted on the fork 72 such that windshield 10 is oriented in a plane that is preferably about 30 degrees from vertical and inclined backwards toward the operator. One of skill in the art will realize the orientation of the windshield may vary from approximately 5 degrees to over 45 degrees from vertical. The combination of the dihedral leading surface and the backward inclination of the windshield 10 produces a total of about 35 degrees of wind deflection across the entire dihedral leading surface when in use. By comparison, state-of-the-art windshields provide approximately 0–15 degrees of wind deflection due to their curved or convex nature.

Figure 4:
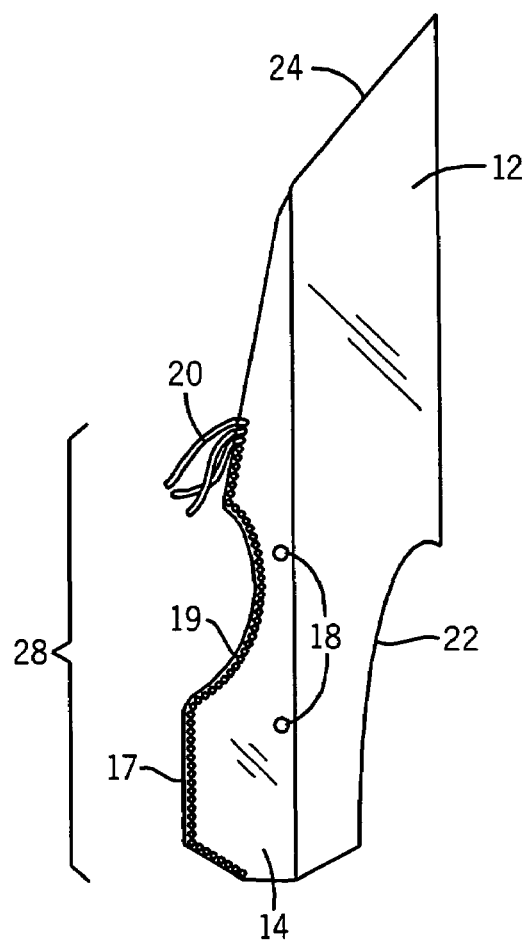
FIG. 4 is a side plan view of the windshield in accordance with the invention.

In the most preferred embodiment, the windshield 10 rises from an imaginary horizontal line three to eight inches below the crotch of the fork 72 to approximately 2–4 inches below the operators line of vision, allowing for the predominant preference of operators to look over, rather than through, the windshield 10. In an alternate embodiment, a lengthened windshield 10 may be provided for operators preferring to look through the windshield. Referring now to FIG. 4, the most preferred embodiment includes an arch-shaped cutout portion 22 to accommodate for a headlight.

The upper edges 24 of first and second portions 11, 12 slope downwardly from the apex of vertex 15 to the connection points with the third and fourth portions 13, 14, respectively. This sloping feature further allows the vehicle operator to look over the windshield 10. The profile of windshield 10 (i.e. the maximum width of windshield 10) when viewed from the front preferably is about 16.5 inches. This narrow profile provides for minimal drag on the vehicle while providing sufficient protection for the operator. Alternatively, a wider version is available for those riders preferring even more protection.

Third and fourth portions 13, 14 comprise side panels parallel to the longitudinal plane of the cycle. Third and fourth portions 13, 14 provide added stability to the cycle when in use by providing a corrective force behind the axis 73 of the fork 72. This corrective force maintains the orientation of the fork into the wind in a manner analogous to the rudder of a boat or to the trailing edge of a weather vane.

Referring now to FIG. 4, third and fourth portions 13, 14 have trailing edges 16, 17 that incorporate incised portions 28 such that no components of the motorcycle, such as the gas tank 74, are contacted when the fork rotates about its permitted arc of travel. Apertures 19 are located near trailing edges 16, 17 and provide for attachment of fringe material 20, such as leather fringe, which extends wind protection and dissipates turbulence in air streaming of the trailing edges of the windshield. The fringe material may also comprise any other flexible material including, but not limited to naugahide, canvas, cloth or plastic.

Figure 5:
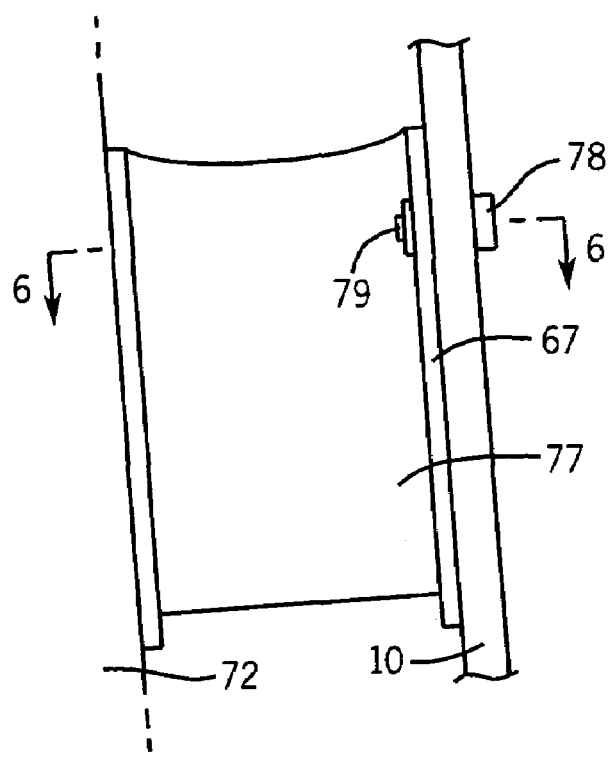
FIG. 5 is a rear plan view of the connection between the windshield and the motorcycle in accordance with the invention.
Figure 6:
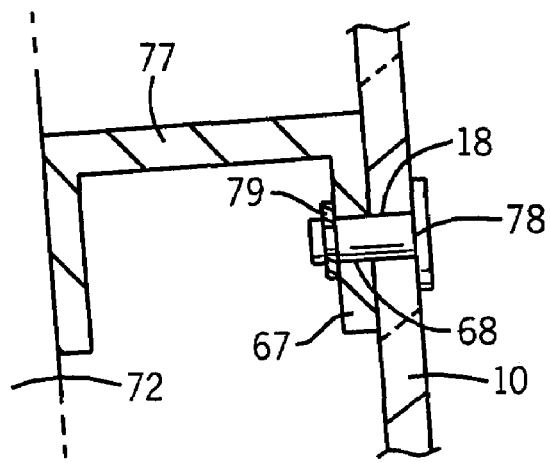
FIG. 6 is a side section view taken along line 6—6 in FIG. 5 showing the connection between the windshield and the motorcycle in accordance with the invention.
Figure 7:
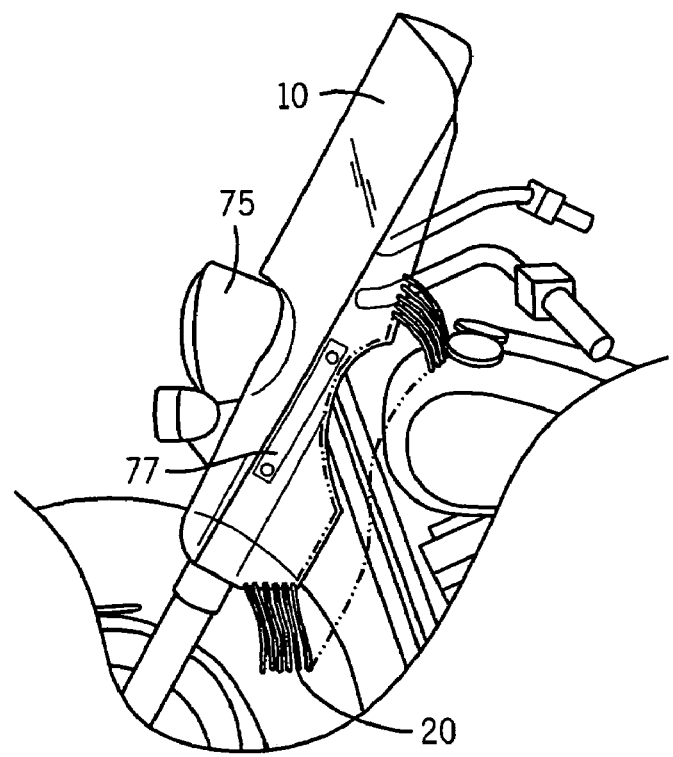
FIG. 7 is a side view of the windshield showing the connection with the motorcycle and leather strips fixed to the windshield in accordance with the invention.
Figure 8:
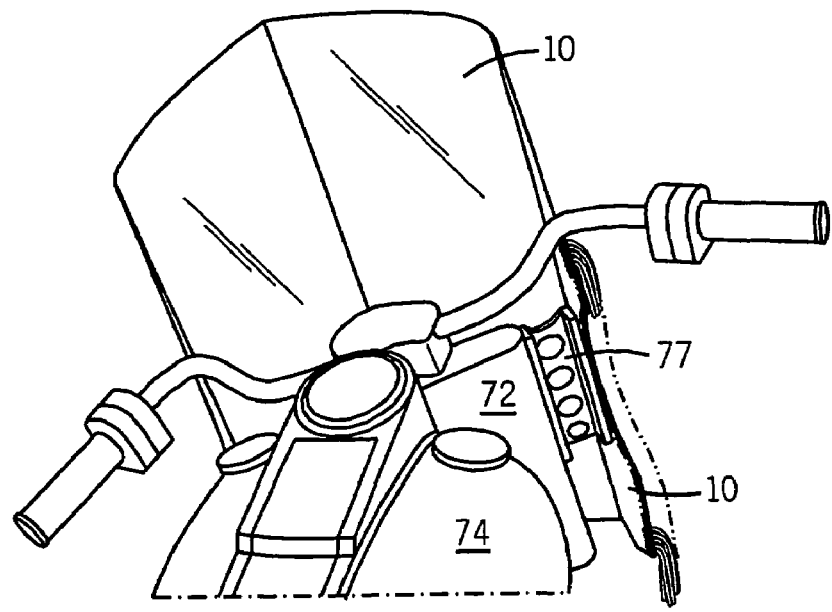
FIG. 8 is a rear perspective view of the windshield in accordance with the invention.

Referring again to FIG. 4, third and fourth portions 13, 14 also include mounting openings 18 which provide for connection to cycle 70. Preferably each portion 13, 14 includes two mounting openings 18. Most preferably, the mounting openings are lined with the rubber grommets or equivalent. Referring now to FIGS. 5 and 6, a pin 78 fits through each opening 18 and connects windshield 10 to bracket 77. Bracket 77 is fixedly mounted on fork 72 of vehicle 70. Bracket 77 comprises a flange portion 67 which includes bracket holes 68 that can be aligned with mounting openings 18. When a hole 68 and opening 18 are aligned, a pin 78 is fitted therethrough. Pin 78 is secured in position by a retaining clip 79. This arrangement allows connection and disconnection of the windshield 10 from the cycle 70 without the use of tools, since retaining clip 70 and pin 78 can be installed and removed by hand. Preferably, bracket 77 is a U-shaped channel mechanically secured to the headstock or legs of the cycle's fork 72. The attachment means described above allow for attachment of windshield 10 to a cycle with adequate strength to withstand oncoming wind, buffeting and turbulence when the cycle is in use without become detached.

In the most preferred embodiment, the windshield 10 is constructed of polycarbonate plastic such as Lexan®, available from GE Plastics. Alternatively the windshield 10 may be constructed of acrylic, safety laminated glass, or metal mesh. Various other alternative materials will be recognized as acceptable to those of skill in the art and are deemed within the scope of this invention such that the windshield has sufficient strength and rigidity to maintain structural integrity under the rigors of prolonged use. Further, windshield 10 when constructed of polycarbonate plastic has sufficient strength and rigidity such that the attachment means described above are the only means necessary to attach windshield 10 to cycle 70, and no additional reinforcement is necessary, eliminating the necessity of metal bracketry that extends into the operator's field of vision. Further, construction of the windshield 10 from polycarbonate plastic allows for the windshield 10 to be hard-coated in accordance with the Federal Glazing Standard, as set forth at FMVSS 205, or any other applicable glazing standard.

The windshield 10 of the present invention is designed such that the windshield 10 breaks away if subjected to a considerable force from behind the windshield 10, such as the force of an operator or passenger impacting upon it in an accident. The windshield 10, as aforementioned, is mounted at a location below the handlebars and it is contemplated that the polycarbonate material will break off in one piece, at a location below the handlebars, rather than shatter, or splinter, resulting in jagged edges. This break-away feature provides a desirable safety advantage for operators and passengers alike.

While the principles of the invention have been shown and described in connection with specific embodiments, it is to be understood that such embodiments are by way of example and are not limiting. For example, the attachment means may have numerous different constructions, yet what is important is that the attachment means allows for attachment of the windshield without the use of tools at a location on the fork of the cycle below the handle bars such that the windshield is attached with adequate strength to withstand wind and side turbulence, but also allows for a "break-away" if subjected to forces in a crash.

Various other combinations and modifications or alterations may also be apparent to one of skill in the art. Such variations, alternatives and other embodiments of the invention are contemplated as being within the scope of the following claims which particularly point out and distinctly claim the subject matter of the invention.

What is claimed is:

1. A windshield for a cycle, comprising:
    a first portion and a second portion, the first and second portion forming a dihedral leading surface, the dihedral leading surface having a vertex at an intersection of the first and second portions;
    a pair of side panels, extending from the first and second portions, said pair of side panels being directly supported by a fork of the cycle;
    wherein the vertex is formed at an included angle of less then 135 degrees to provide deflection of oncoming wind.

2. The windshield of claim 1, wherein the side panels extend from the first and second portions at an included angle of less than 135 degrees.

3. The windshield of claim 1, wherein the side panels comprise incised portions, the incised portions providing clearance for components of the cycle when the windshield is attached to a cycle.

4. The windshield of claim 1, wherein the side panels each comprise a trailing edge, and further wherein the trailing edges provide for the attachment and securement of a fringe material for extending wind protection and dissipating turbulence in the air streaming off the trailing edge.

5. The windshield of claim 1, further comprising attachment means for attaching the windshield to a cycle.

6. The windshield of claim 5 wherein the attachment means allows for the attachment and removal of the windshield to a cycle without the use of tools.

7. The windshield of claim 5 wherein the attachment means attaches the windshield to a cycle with adequate strength to withstand oncoming wind, buffeting and turbulence when the cycle is in use without coming detached.

8. The windshield of claim 5 wherein the attachment means further comprises a break-away feature, wherein the break-away feature allows for one piece break-away of the windshield if subjected to rear impact from a cycle's rider or passenger in a crash.

9. The windshield of claim 5, wherein the windshield is attached to a cycle such that the vertex of the windshield is aligned with a longitudinal centerline of the cycle.

10. The windshield of claim 9, wherein the dihedral leading surface is inclined backward from the longitudinal centerline in the range of 5 to 45 degrees, such that the backward inclination and dihedral leading surface produce a total of about 35 degrees of wind deflection when the cycle is in use.

11. The windshield of claim 9, wherein the side panels are parallel to a longitudinal plane of the cycle such that the side panels provide added stability to the cycle when in use by providing a corrective force behind the axis of the fork, to maintain the orientation of the fork into the wind.

12. The windshield of claim 5, wherein the windshield is constructed of polycarbonate plastic, wherein the windshield has sufficient strength and rigidity to maintain structural integrity under the rigors of prolonged use such that no additional re-enforcement is necessary.

13. The windshield of claim 12, wherein the windshield may be hard-coated in accordance with the FMVSS 205 vehicle-glazing standard.

14. The windshield of claim 5, wherein the windshield is constructed of laminated glass, wherein the windshield has sufficient strength and rigidity to maintain structural integrity under the rigors of prolonged use such that no additional reinforcement is necessary.

15. The windshield of claim 5, wherein the windshield is constructed of acrylic, wherein the windshield has sufficient strength and rigidity to maintain structural integrity under the rigors of prolonged use such that no additional reinforcement is necessary.

16. The windshield of claim 15, wherein the windshield may be hard-coated in accordance with the FMVSS 205 vehicle glazing standard.

17. The windshield of claim 5, wherein the attachment means attaches the windshield to a cycle on the fork of the cycle, below a cycle's handlebars.

18. The windshield of claim 5, wherein the attachment means comprise at least two U-shaped channels mechanically secured to the headstock of a cycle's fork, and at least two pins and clips, wherein the pins are passed through holes in the windshield and the U-shaped channels and secured with the clips in order to attach the windshield to a cycle.

19. The windshield of claim 5, wherein the attachment means comprise at least two u-shaped channels mechanically secured to the legs of a cycle's fork, and at least two pins and clips, wherein the pins are passed through holes in the windshield and the u-shaped channels and secured with the clips in order to attach the windshield to a cycle.

20. The windshield of claim 1, wherein the side panels extend from the first and second portions at an angle of approximately 120 degrees.

21. The windshield of claim 1, wherein the vertex is formed at an angle of approximately 120 degrees to provide deflection of oncoming wind.

22. The windshield of claim 10, wherein the dihedral leading surface is inclined backward from the longitudinal centerline at approximately 30 degrees.

23. A windshield for a cycle, comprising:
   a first portion and a second portion forming a dihedral leading surface, the dihedral leading surface having a vertex at an intersection of the first and second portions;
   a pair of parallel side panels, extending from the first and second portions, said pair of side panels being directly supported by a fork of the cycle; and
   an attachment means for attaching the windshield to a cycle with adequate strength to withstand oncoming wind and side turbulence when the cycle is in use; wherein the windshield is attached to a cycle such that the vertex of the windshield is aligned with a longitudinal centerline of the cycle such that the dihedral leading surface deflects air flow at an angle generally perpendicular to the vertex and around an operator of the cycle.

24. The windshield of claim 23, wherein the side panels extend from the first and second portions at an included angle of less than 135 degrees.

25. The windshield of claim 23, wherein the vertex is formed at an included angle of less than 135 degrees to provide deflection of oncoming wind.

26. The windshield of claim 23, wherein the side panels extend from the first and second portions at an angle of approximately 120 degrees.

27. The windshield of claim 23, wherein the vertex is formed at an angle of approximately 120 degrees.

28. The windshield of claim 23, wherein the side panels are parallel to a longitudinal plane of the cycle such that the side panels provide added stability to the cycle when in use by providing a corrective steering force behind the axis of the fork, to maintain the orientation of the fork into the wind.

29. The windshield of claim 23, wherein the side panels comprise incised portions, the incised portions providing clearance for components of the cycle.

30. The windshield of claim 23, wherein the side panels each comprise a trailing edge, and further wherein the trailing edges comprise a fringe material for extending wind protection and dissipating turbulence.

31. The windshield of claim 30, wherein the fringe material is leather.

32. The windshield of claim 23 wherein the attachment means allows for the attachment and removal of the windshield to a cycle without the use of tools.

33. The windshield of claim 23 wherein the attachment means further comprises a break-away feature, wherein the break-away feature allows for one piece break-away of the windshield if subjected to rear impact from a cycle's rider or passenger in a crash.

34. The windshield of claim 23, wherein the attachment means attaches the windshield to a cycle on the fork of the cycle, below a cycle's handlebars.

35. The windshield of claim 23, wherein the attachment means comprise at least two U-shaped channels mechanically secured to a headstock of a cycle's fork, and at least two pins and clips, wherein the pins are passed through holes in the windshield and the U-shaped channels and secured with the clips in order to attach the windshield to a cycle.

36. The windshield of claim 23, wherein the attachment means comprise at least two u-shaped channels mechanically secured to the legs of a cycle's fork, and at least two pins and clips, wherein the pins are passed through holes in the windshield and the u-shaped channels and secured with the clips in order to attach the windshield to a cycle.

37. The windshield of claim 23, wherein the windshield is constructed of polycarbonate plastic, wherein the windshield has sufficient strength and rigidity to maintain structural integrity under the rigors of prolonged use such that no additional re-enforcement is necessary.

38. The windshield of claim 37, wherein the windshield may be hard-coated in accordance with the FMVSS 205 vehicle-glazing standard.

39. The windshield of claim 23, wherein the windshield is attached to the cycle such that the windshield is inclined backward toward an operator from a longitudinal centerline of the cycle in the range of 5 to 45 degrees, such that the backward inclination and dihedral leading surface produce a total of about 35 degrees of wind deflection.

40. The windshield of claim 39, wherein the windshield is inclined backward toward the operator at about 30 degrees.

41. The windshield of claim 23, wherein the windshield is constructed of laminated glass, wherein the windshield has sufficient strength and rigidity to maintain structural integrity under the rigors of prolonged use such that no additional reinforcement is necessary.

42. The windshield of claim 23, wherein the windshield is constructed of acrylic, wherein the windshield has sufficient strength and rigidity to maintain structural integrity under the rigors of prolonged use such that no additional reinforcement is necessary.

43. The windshield of claim 42, wherein the windshield may be hard coated in accordance with the FMVSS 205 vehicle glazing standard.

44. A windshield for a cycle, the windshield being of unitary construction and comprising:
   a leading surface;
   a pair of side panels being substantially parallel to a longitudinal plane of the cycle, said pair of side panels being directly supported by a fork of the cycle; and
   an attachment means for attaching the windshield to a cycle with adequate strength to withstand oncoming wind and side turbulence when the cycle is in use; wherein the windshield has sufficient strength and rigidity to maintain structural integrity under the rigors of prolonged use such that no additional re-enforcement is necessary.

45. The windshield of claim 44, wherein the leading surface is dihedral.

46. The windshield of claim 44, wherein the side panels comprise incised portions, the incised portions providing clearance for components of the cycle.

47. The windshield of claim 44, wherein the side panels each comprise a trailing edge, and further wherein the trailing edges comprise a fringe material for extending wind protection and dissipating turbulence.

48. The windshield of claim 47, wherein the fringe material is leather.

49. The windshield of claim 44, wherein the attachment means allows for the attachment and removal of the windshield to a cycle without the use of tools.

50. The windshield of claim 44, wherein the attachment means further comprises a break-away feature, wherein the break-away feature allows for one piece breakaway of the windshield if subjected to rear impact from a cycle's rider or passenger in a crash.

51. The windshield of claim 44, wherein the attachment means attaches the windshield to a cycle on the fork of the cycle, below a cycle's handlebars.

52. The windshield of claim 44, wherein the attachment means comprise at least two U-shaped channels mechanically secured to a headstock of a cycle's fork, and at least two pins and clips, wherein the pins are passed through holes in the windshield and the U-shaped channels and secured with the clips in order to attach the windshield to a cycle.

53. The windshield of claim 44, wherein the attachment means comprise at least two U-shaped channels mechanically secured to the legs of a cycle's fork, and at least two pins and clips, wherein the pins are passed through holes in the windshield and the U-shaped channels and secured with the clips in order to attach the windshield to a cycle.

54. The windshield of claim 44, wherein the windshield is constructed of polycarbonate plastic.

55. The windshield of claim 44, wherein the windshield is constructed of laminated glass.

56. The windshield of claim 44, wherein the windshield is constructed of acrylic.

57. The windshield of claim 54, wherein the windshield may be hard-coated in accordance with the FMVSS 205 vehicle-glazing standard.

58. The windshield of claim 56, wherein the windshield may be hard-coated in accordance with the FMVSS 205 vehicle-glazing standard.

59. The windshield of claim 44, wherein the windshield is attached to the cycle such that the windshield is inclined backward toward an operator from a longitudinal centerline of the cycle in the range of 5 to 45 degrees, such that the backward inclination and dihedral leading surface produce a total of about 35 degrees of wind deflection.

60. The windshield of claim 59, wherein is inclined backward toward the operator at about 30 degrees.

* * * * *